Figure 5:
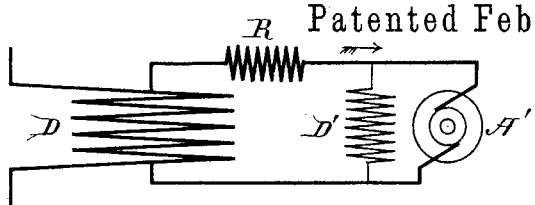

(No Model.) 2 Sheets—Sheet 1.
E. THOMSON.
DYNAMO ELECTRIC MACHINE.
No. 533,931. Patented Feb. 12, 1895.
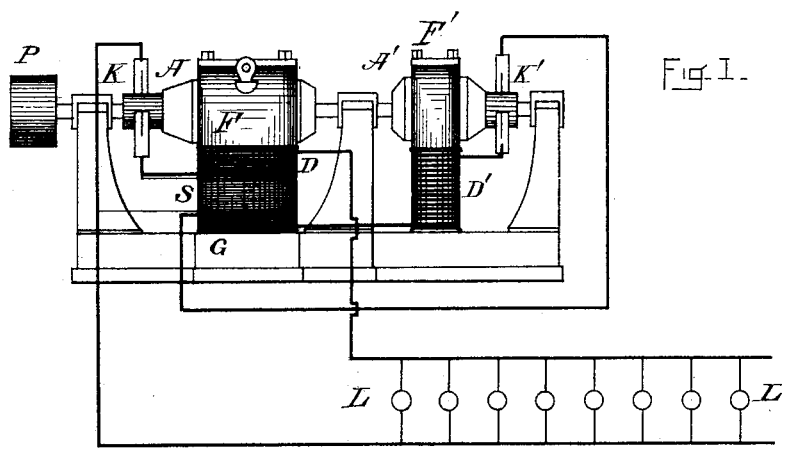
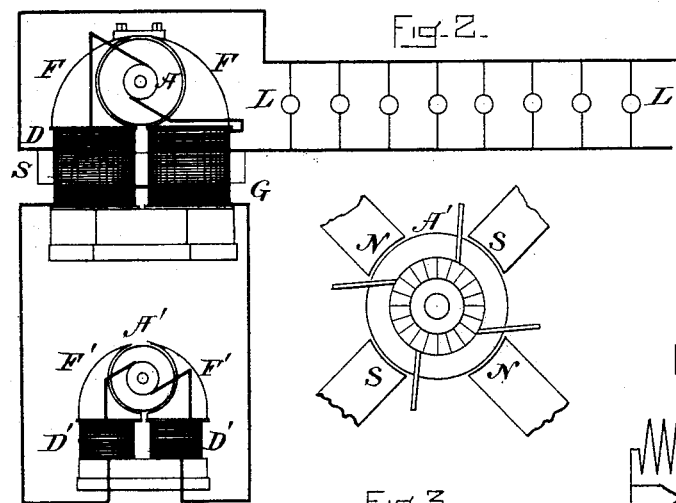
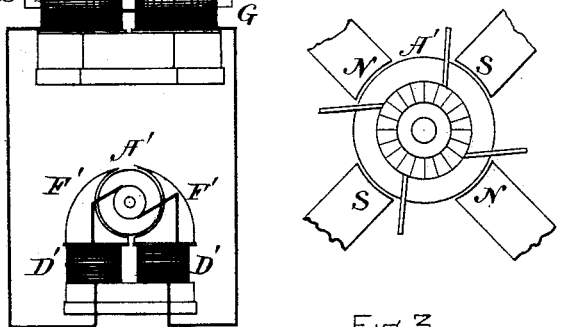
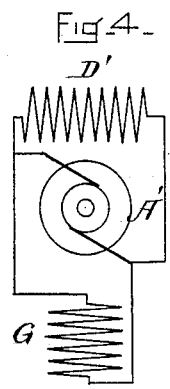
WITNESSES.
A. F. Macdonald.
J. F. Courey.
INVENTOR.
Elihu Thomson
By H. C. Townsend
Atty (No Model.) 2 Sheets—Sheet 2.

E. THOMSON.
DYNAMO ELECTRIC MACHINE.

No. 533,931. Patented Feb. 12, 1895.

Witnesses
A. F. Macdonald.
C. F. Courry

Inventor
Elihu Thomson.
By H. C. Townsend
Atty

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

DYNAMO-ELECTRIC MACHINE.

SPECIFICATION forming part of Letters Patent No. 533,931, dated February 12, 1895.

Application filed December 29, 1890. Serial No. 376,167. (No model.)

*To all whom it may concern:*

Be it known that I, ELIHU THOMSON, a citizen of the United States, and a resident of Swampscott, in the county of Essex and State of Massachusetts, have invented certain new and useful Improvements in Dynamo-Electric Machines, of which the following is a specification.

My present invention relates to a method of and apparatus for rendering compound-wound and other dynamos less subject to the effects of changes of speed of driving.

My invention is applicable to continuous current generators, to alternating current generators where no commutators are used in the main circuit, and to other types of electric generators, although I shall herein describe my invention as applied to machines constructed to maintain a practically constant potential on its mains, or to a machine adapted to supply translating devices in multiple arc variable or not in number.

The manner of applying or practicing the invention in connection with other machines will be obvious from the subjoined description.

In general electrical practice it is found that a constant potential or a potential which is kept up to a certain amount or increased beyond a definite amount, when the load is brought on, may be obtained by compounding the dynamo or winding it in such a way that the field is influenced by a shunt to the armature or to the mains or is otherwise given a magnetization of practically constant energy or effort, and also by the direct current which is fed to the work or by current from any source varying with that fed to the work, the winding in the shunt being called the shunt circuit winding and the winding carrying the direct current or that varying with it, the series winding. Such machines, however, are sensitive to speed changes. When the speed increases the potential rises beyond the normal for any given load and when it falls the potential may fall to a disastrous extent while the relation between the two windings, the series and the shunt, or other magnetizing influences, is also disturbed as affecting the field. In a shunt wound generator, that is one energized wholly by a shunt winding, the same actions are noticeable, variations of speed requiring frequent adjustments of the strength of the magnetic field. The same difficulties are also experienced in the running of machines in which part or all of the field magnetism is obtained from a separate exciter, machine or generator in a circuit independent of the main or working circuit.

The object of my invention is to render the machine insensible to such changes of speed which I accomplish by the application to the machine of a coil or circuit the variations of current in which are due primarily to a structure more sensitive to speed changes than the main machine, so that with variations of speed there shall be a variation in said coil or circuit at a special rate, as hereinafter described, so that it shall automatically and without hand adjustment or changed relation of the moving parts adjust the field strength to the increase of speed and when the speed decreases shall affect automatically an opposite adjustment, whereby the field magnets of the generator will be strengthened when the speed falls and decreased in strength when the speed rises.

My invention consists essentially in applying to the machine a counteracting or adjusting coil or circuit to which is connected a separate source of energy whose effect on said coil or circuit is variable with changes of speed and which is more sensitive to speed changes than said machine, and in operating or running said source at speeds which vary co-ordinately with the speeds of running of the machine. Such coil or circuit may be termed a counter or demagnetizing coil or circuit and its effect in connection with the source of energy, variable as hereinafter described, may, generally speaking, be said to be one of counter excitation since its tendency is to oppose or cut down or reverse the normal excitation of the machine.

My invention consists further in compounding a dynamo machine with a counter excitation produced by the action of a separate source of energy more sensitive to speed changes than said dynamo and operated at a speed varying co-ordinately with the variations in speed of said dynamo.

My invention consists also in the special methods and combinations of circuits and devices more particularly hereinafter described and specified in the claims.

In the accompanying drawings:—Figure 1, is a side elevation of an apparatus embodying means for practicing my invention. Fig. 2, shows a modified means. Fig. 3, shows a detail of a generating source having the desired qualities or characteristics as a source sensitive to speed changes. Figs. 4, 5, 6, 7 and 8, are diagrams illustrating details of the circuits and modifications of the invention.

In Fig. 1, A, is the rotating armature driven by the pulley P, and K, is the commutator or collector having connections to the main circuit feeding the lamps or other working resistances L, L. The main armature A, revolves in the field produced by the field poles of the magnets surrounding it as at F, upon which magnets are shown in the usual windings, to wit: D, a direct circuit winding, traversed by the main current of the machine, and S, which latter is the shunt winding or shunt coil in derivation across the terminals of the machine. Said coils or windings act together in the ordinary manner as compound windings to produce an excitation of the field magnet, and with a definite speed at the pulley P, no further adjustment would be requisite to operate the machine successfully except perhaps means for regulating the stength of the currents in D and in S, devices which are frequently attached to these windings for the purpose of adapting the magnetic effects one to the other. In addition to the excitation afforded by said coils I provide, according to my present invention, a counter excitation by means of a separate source of energy having the characteristics herein described and composed of an armature revolved in a field F', preferably by attachment to the shaft of A, the currents from which armatures are carried out to the commutator K', and pass through a coil G, on the main field F, but reversely in direction to the direction taken by the currents in the coils S, D. This current may also serve to energize the field magnets of the machine F', by passing through the coils D', upon them. The machine so organized will produce its most useful effects in counteracting the effects of speed when the structure of the machine A', F', is so different from A, F, and so special that at low speeds its electro-motive force is low and at increasing speeds this electro-motive force increases much more rapidly or in greater rates than the speed. If a machine having these properties be provided then the current passing in the coils G, tending to demagnetize the field F, will increase at a much greater rate than the current in the other windings when an increase of field takes place, and consequently will serve to hold down the potential or reduce the total maximum of the field F, to an extent to prevent the armature A, though revolving at a higher speed than before, from developing more than the normal electro-motive force. Similarly on a decrease of the field F, the reverse actions will take place. The current in G, will diminish more than in proportion to the decrease so that the directly acting coils D, S, may have a proportionally greater effect and bring up the field magnetism to a strength which is sufficient to develop the proper electro-motive force in the armature A, at the lower speed.

While in Figs. 1 and 2, the machines are shown on the same shaft it is evident that they may be driven by the same power in any way or be driven by different powers provided only that there is a proportionality between their speeds, or their speeds vary coordinately. Fig. 2, shows them as having their armatures on separate shafts. The arrangement in this case will be understood at a glance to be otherwise the same as in Fig. 1. In order to obtain the properties required in the machine F', or the auxiliary exciting machine, various changes in the proportion of the machine may be made, the object being to have the machine slightly active under speeds below the normal and increase rapidly in activity as the speed rises.

Fig. 3, indicates one of the ways in which I am enabled to obtain the desired action. The armature A', multipolar in character, that is surrounded by four field poles, is wound with wire and given a considerable magnetizing effect relatively to the strength of the field poles themselves, which poles may receive their magnetism from shunt coils D', connected to the commutator brushes as in Fig. 4. If these brushes in such a machine be placed somewhat forward of the diameter of commutation, that is slightly under the field pole relatively to the winding on the armature, the machine may be made sensitive to increase of speed in such a way that when the speed is low and there is very little distortion of the magnetic field forward, the potential will be quite low, and when the field has been driven forward by distortion by an increasing load existing on the armature coils, the potential will rise in greater ratio than the speed. These properties are well known to makers of dynamos to exist in particular forms and types of which this is an example.

Figure 6:
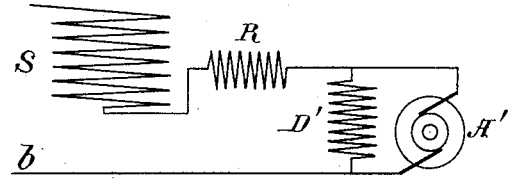

Fig. 4, shows the circuit arrangement which might be used in the cases just mentioned where the coil G, which is the demagnetizing or regulating coil for the main machine is fed in one branch from the armature circuit of A', while the magnets of the machine of which A', is a part are worked as at D, that is in shunt. It is not of course necessary that there be a third winding on the main machine as at F, Fig. 1, but the counter excitation or magnetization may be obtained by affecting the current strengths passing in the coils D and S, or weakening the effects of these coils on increase of speed, and vice versa. Thus in Fig. 5, the armature A', excited by the shunt D', may be made to assist the diversion of current or increase of speed from the direct or main coils D, through a resistance R. The auxiliary machine in this case will still have the property of increasing its electro-motive force under increase of speed more rapidly than the main machine. In Fig. 6, a similar effect is shown as obtained by putting the armature A', in series with the winding S, of the main machine and causing it under increase of speed to oppose the tendency to flow of current in S, the properties of the machine A', being assumed to be the same as before to have a greatly increasing effect under increase of speed.

Figure 7:
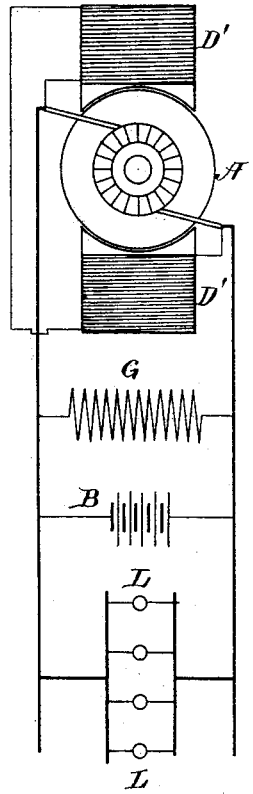
Figure 8:
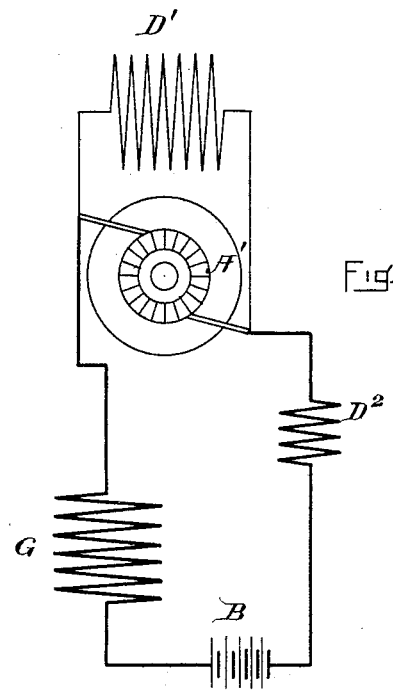

In Fig. 7, the disposition of the circuits of the exciting machine A', is varied to give the results mentioned. The field coils D', D', in shunt act upon cores maintained always below saturation. The commutator brushes on the commutator of the armature A', are set well forward so as to be within the area of the action of the poles and to effect a distortion forward under load of the armature A, as produced on the magnetic field with the tendency to increasing potential. This armature may, if desired, carry a dead resistance load L, L, in addition to the coil G, and may also be arranged to have its current passed into a counter-potential battery B, or set of polarizing cells whereby on an increase of electro-motive force a considerable load is thrown on the armature by current passing through the battery in greater amount than at a less speed and lower potential. This increases the distortive effects. Fig. 8, shows a similar arrangement in which the battery B, is placed in series with the main circuit machine or counter exciting coil G, while the field magnet which affects the armature A', is connected as shown at D', and there may be in addition a direct coil acting together with the coil D', to compound the machine as at $D^2$, the coils D', $D^2$, acting therefore to furnish an increasing field under load of the armature A', while the coil G, acts to demagnetize the main machine as in Fig. 1. The polarizing cells at B, will have their counter-electro-motive force, quickly overcome under increase of speed and under decrease of speed their counter-electro-motive force will be such as to almost entirely obliterate the current passing in the coil G, or even to reverse it slightly. This arrangement gives the desirable properties mentioned as requisite to the efficient working of the demagnetizing or counter-exciting source, the action of which must be increased in value at a greater and greater rate under increase of speed in order that it may not only counteract the effects of increased magnetizing power by D, S, Fig. 1, but actually in part overcome them as the speed rises.

What I claim as my invention is—

1. The herein described method of regulating a dynamo for constant potential under changes of speed, consisting in applying a counter excitation by means of a separate source of energy more sensitive to speed changes than the main dynamo, as and for the purpose described.

2. The herein described method of regulating a dynamo for constant potential under changes of speed, consisting in employing a counter-excitation to the machine variable with the speed of the machine, and of slight effect under speeds below normal, and increasing the counter-excitation rapidly as the speed rises.

3. The herein described method of regulating a dynamo for constant potential under increase of speed, consisting in increasing the speed of a separate generator more sensitive to speed changes, and using the increased current of such generator as a generated counter magnetizing force on the main.

4. A dynamo electric generator having three compounded magnetizing circuits, one from the main circuit and in series therewith, another from a shunt circuit having a substantially constant influence, and a third from a circuit the variations of the current in which are due primarily to a structure more sensitive to speed changes than the main machine.

5. The combination with a dynamo machine, of a main field coil, a shunt field coil, and an auxiliary coil connected to the circuit of a separate machine specially sensitive to speed changes and varying in speed with said dynamo.

6. The combination with a compound wound dynamo machine, of an auxiliary dynamo generator specially sensitive to speed changes and driven at a speed varying coordinately with that of the main dynamo, and an opposing coil on the main field supplied with magnetizing current from said auxiliary generator.

Signed at Lynn, in the county of Essex and State of Massachusetts, this 22d day of December, A. D 1890.

ELIHU THOMSON.

Witnesses:
JOHN W. GIBBONEY,
BENJAMIN B. HULL.